United States Patent

Persson et al.

[11] 4,293,605
[45] Oct. 6, 1981

[54] TIE FOR WOOD PILES

[76] Inventors: Alf Persson, Badhusgatan 10, 686 00, Sunne; Nils O. Söderberg, Skogsberg 680 15, Backalund, both of Sweden

[21] Appl. No.: 56,941

[22] Filed: Jul. 12, 1979

[51] Int. Cl.³ .................... B32B 3/04; B65D 85/62
[52] U.S. Cl. .............................. 428/126; 108/51.3; 108/91; 206/321; 206/516; 428/193
[58] Field of Search ............... 428/123, 126, 193, 188; 108/51.3, 91; 206/503, 598, 386, 516, 321

[56] References Cited

U.S. PATENT DOCUMENTS

| | | | |
|---|---|---|---|
| 1,650,051 | 11/1927 | Smith | 428/60 X |
| 1,986,136 | 1/1935 | Copeland | 428/123 X |
| 2,657,161 | 10/1953 | Luitwieler | 428/192 |
| 2,698,696 | 1/1955 | Strong | 108/51.3 X |
| 2,774,490 | 12/1956 | Strong | 108/51.3 X |
| 3,026,015 | 3/1962 | Severn | 108/51.3 X |
| 3,273,518 | 9/1966 | Shina | 108/51.3 |
| 3,456,602 | 7/1969 | Davidson | 108/51.3 |
| 3,892,902 | 7/1975 | Ilukowicz | 428/99 |
| 3,907,130 | 9/1975 | Hutcheson | 34/94 |
| 4,069,359 | 1/1978 | DeMarse et al. | 428/188 X |
| 4,125,964 | 11/1978 | Waggoner | 47/33 |

FOREIGN PATENT DOCUMENTS 2137703 2/1973 Fed. Rep. of Germany ..... 108/51.3
361026 8/1973 Sweden .

Primary Examiner—Henry F. Epstein
Attorney, Agent, or Firm—Cushman, Darby & Cushman

[57] ABSTRACT

An inexpensive, easily produced device is provided for insertion between layers of wooden boards, which device has sufficient resistivity against longitudinally directed stresses, sufficient frictional engagement with the wooden boards, and sufficient ease of insertion, that the device may be advantageously utilized with piles of boards to prevent the piles from falling apart during handling. The device comprises a longitudinally enlongated strip of stiff cellulosic material having a predetermined constant width and formed by a pair of adhesively secured layers over the majority of the width thereof, and defining a plane. A pair of longitudinally elongated projections, one disposed on either lateral edge of the strip, and formed from at least one of the layers of stiff cellulosic material, stands upright from the plane of the strip substantially the entire length of the strip. The projections, preferably channels having a triangular cross-section and filled with bundles of hemp fibers or the like, deform somewhat toward the plane of the strip at the points of contact with the boards so that good frictional engagement is provided.

6 Claims, 3 Drawing Figures

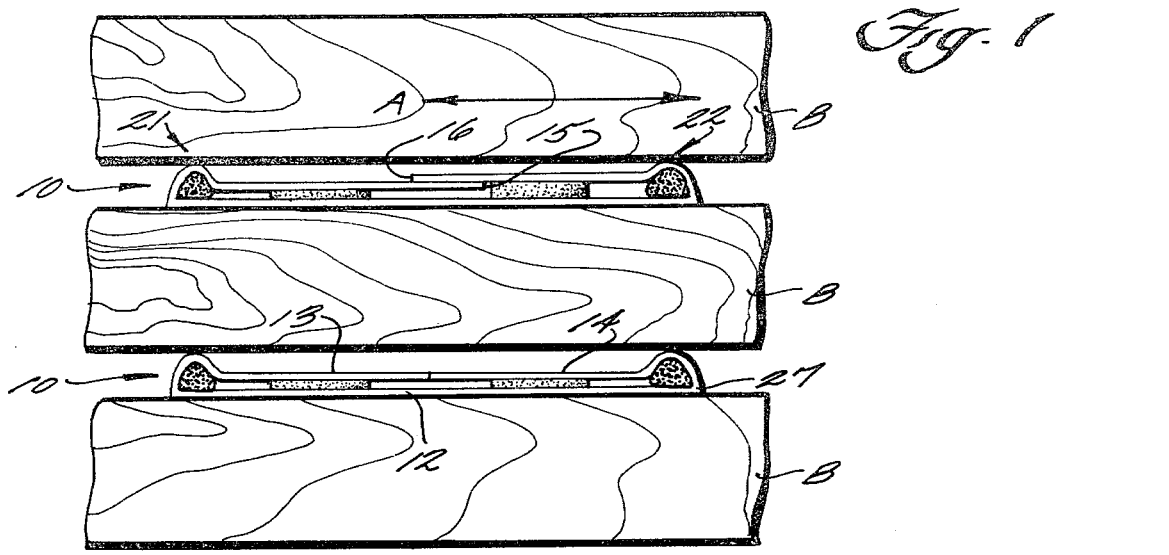
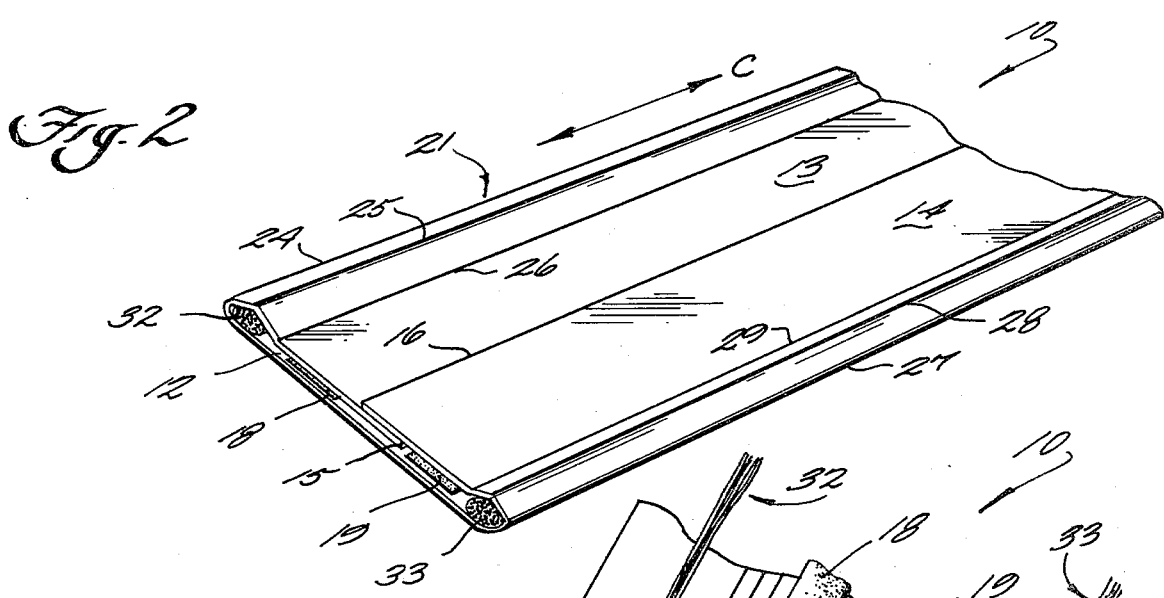
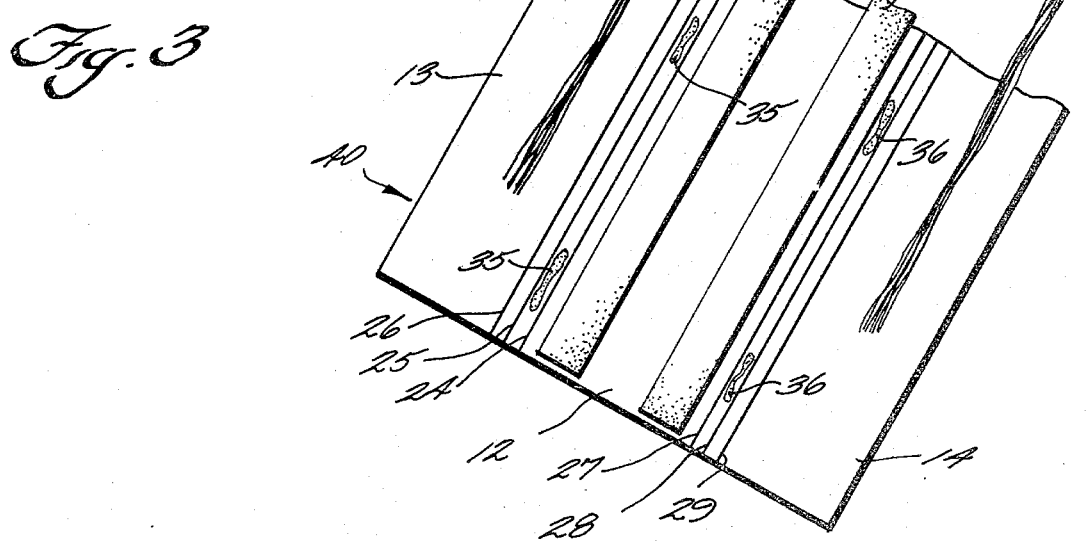

TIE FOR WOOD PILES

BACKGROUND AND SUMMARY OF THE INVENTION

In the handling of piles of wood (layers of wooden boards or like structures) it is desirable to provide devices—commonly called "ties"—extending transversely to the boards between the boards to prevent the piles from falling apart during handling. Such ties are useful, both in sawmills or planning mills, before the piles are strapped together, and also are useful to the ultimate consumers after the strappings have been removed.

Conventionally such ties are provided by simple strips of scrap wood or the like. While such pieces of scrap wood are generally acceptable, since wood is not inherently a homogeneous material—but rather contains knots and other irregularities—the wood strips become irregular, locally weakened and unwieldy if they are too thin. If made thick enough so that such undesirable irregularites are avoided, then they become increasingly expensive and can significantly increase the overall dimensions of a pile with a specified number of boards.

According to the present invention, a device is provided that replaces conventional wooden strips in the stacking of wood piles, which device performs the ultimate functions of the wood strips as well as or better than the wood strips. The devices according to the present invention are inexpensive and easily produced, have sufficient resistivity against longitudinally directed tensile stresses, provide sufficient frictional engagement, and are sufficiently readily insertable during formation of a wood pile, so that stacking may be accomplished quickly, safely, and easily, utilizing automatically operated devices if desired, to provide a final pile capable of easy handling.

The device according to the present invention comprises a longitudinally elongated strip of stiff cellulosic material (such as cardboard) having a predetermined constant width and formed by a pair of layers over the majority of the width thereof, and defining a plane. Means are provided for maintaining the layers together, such as adhesive; and means are provided for imparting bending resistance to the strips so that when held at one end with that end horizontal the free end does not deflect significantly from the horizontal. The bending resistance imparting means preferably comprises a plurality of longitudinally elongated projections formed from at least one of the layers of stiff cellulosic material, and standing upright from said plane substantially the entire length of said strip.

The longitudinally upstanding projections preferably consist of a pair of projections, one provided at each of the lateral edges of the strip. Each projection is defined by a longitudinally extending channel that is substantially triangular in cross-section with two legs of the triangle formed from one of the strip layers and other leg formed from the other of the strip layers. Buckling of the channels is prevented by a fibrous material bundle disposed in the channel and adhesively secured to the channel. The fibrous material bundle may comprise a plurality of strands of a material such as hemp, sisal, or spun paper.

It is the primary object of the present invention to provide an improved device facilitating the stacking of wooden boards or the like into a pile for easy handling. This and other objects of the invention will become clear from an inspection of the detailed description of the invention, and from the appended claims.

BRIEF DESCRIPTION OF THE DRAWINGS

FIG. 1 is a side view schematically illustrating a stack of objects utilizing the devices according to the invention;

FIG. 2 is a perspective view of a portion of an exemplary device according to the invention; and FIG. 3 is an exploded view of the device of FIG. 2.

DETAILED DESCRIPTION OF THE DRAWINGS

Exemplary devices 10 according to the present invention are shown in use in FIG. 1, the devices 10 being interposed between layers of wooden boards B or the like. The boards B are elongated in a first direction A, while the devices 10 are elongated in a second direction (C—see FIG. 2) transversed to the direction A (coming out of the plane of the paper in FIG. 1).

Each device 10 according to the present invention comprises a longitudinally elongated strip of stiff cellulosic material having a predetermined constant width and formed by a pair of layers over the majority of the width thereof and defining a plane. The layers include a bottom layer 12, and a top layer preferably formed by adjacent pieces 13, 14. The pieces 13, 14 have longitudinal edges 15, 16 thereof respectively, and such edges can abut each other (as illustrated in FIG 1), or one edge may overlap the other (as illustrated in FIG. 2), or the edges may be spaced slightly from each other. Suitable means are provided for maintaining the layers together, such as the adhesive 18, 19 (see FIGS. 2 and 3 in particular).

The devices 10 according to the present invention further comprise means for imparting bending resistance to the strip so that when held at one end with that end horizontal the free end does not deflect significantly from the horizontal. Such means preferably comprise a plurality of longitudinally elongated projections, illustrated generally at 21 and 22 in the drawings formed from at least one of the layers of stiff cellulosic material, and standing upright from the plane of the strip substantially the entire length of the strip (see FIGS. 1 and 2 in particular). The longitudinally upstanding projections 21, 22 are preferably defined by several adjacent folding lines, each folding line extending substantially the length of the strip. For instance lines 24, 25, and 26 are provided for forming projection 21, and lines 27, 28, and 29 for forming projection 22.

The longitudinally upstanding projections 21, 22 preferably are provided at the lateral edges of the strip and are defined by a longitudinally extending channel (see FIGS. 1 and 2 in particular) that is substantially triangular in cross-section. Two of the legs of each triangle (i.e. the edge lengths between lines 24, 25 and 25, 26; and the edge lengths between lines 27, 28 and 28, 29) are formed from one of the strip layers (i.e. 13 or 14, respectively), and join at an obtuse angle (see FIGS. 1 and 2) to define an apex upstanding from said one layer; while the other leg of the triangle is formed from the other of the strip layers (12).

Preferably means are provided for preventing buckling of the channels. Such means comprises fibrous material bundles 32, 33 that may be disposed in the channels 21, 22, respectively. Such bundles 32, 33 also assume part of the tensile strain applied to the strip, and for that reason they are adhesively attached to the interiors of the channels, as by the adhesive indicated schematically at 35 and 36 in FIG. 3. The fibrous material bundles 32, 33 each preferably comprise a plurality of individual strands of material. Suitable materials include hemp, sisal, and spun paper.

The channels 21, 22 so formed will be deformed somewhat toward the plane of the strip (as illustrated in FIG. 1) so as to provide good frictional engagement with the boards B even though the surface of the strip is quite smooth.

While the number and positioning of the projections may be varied, as well as the exact overlap and configuration of the layers 12, 13, and 14, a preferred device 10 according to the present invention may be readily constructed from a stiff piece of cellulosic material and a pair of fiber bundles 32, 33. As illustrated in FIG. 3, a single piece of material 40 is provided, having the pre-scored lines 24–29 formed thereon, and having adhesive strips or dots 18, 19, 35, and 36 applied thereto. The fibrous bundles 32, 33 are placed into engagement with the adhesive bundles portions 35, 36, with the ends of the bundles 32, 33 coterminus with the ends of the sheet 40, and then the layers 13, 14 are folded upwardly with respect to the layer 12 about the lines 24, 27, and then the projections 21, 22 are formed by folding about lines 25, 26 and 28, 29 respectively. Care is taken to insure that the bundles 32, 33 are snuggly received by the channels formed by projections 21, 22 and then the layers 13, 14 are pressed into engagement with the adhesive strips 18, 19 respectively to form the completed device 10.

While the device 10 may be formed from a wide variety of stiff cellulosic materials, cardboard or stiff paper is preferred. Cardboard coated with plastic of 200 to 300 g/m$^2$ (such as is used conventionally for milk cartons) is particularly advantageous for use according to the invention. The device 10 formed preferably has a predetermined width of 3 to 8 centimeters, and the projections 21, 22 upstand approximately 2 millimeters from the plane of the layers 12, 13, 14. Strips of length up to 0.5 meters produced according to the invention are self-supporting (that is there will be no significant horizontal deflection at the free end when a fixed end is held substantially horizontally).

While the embodiment illustrated in the drawings shows the projections 21, 22 extending upwardly from the same face of the device 10, in fact the projections may extend from opposite faces. While the devices 10 may readily be formed from a single piece of cardboard 40, alternatively two separate and distinct pieces of cardboard may form the layers 12, and 13, 14, respectively; and more layers may be provided if desired.

It will thus be seen that according to the present invention an inexpensive, easily constructed device for insertion between layers of wooden boards has been provided. The device has sufficient resistivity against longitudinally directed tensile stresses, provides sufficient frictional engagement with the boards to perform the desired functions, and may be utilized to form stacks of alternating layers of boards and devices, quickly, safely, and utilizing automatic devices if desired.

While the invention has been herein shown and described in what is presently conceived to the most practical and preferred embodiment thereof, it will be apparent to those of ordinary skill in the art that many modifications may be made thereof within the scope of the invention, which scope is to be accorded the broadest interpretation of the appended claims so as to encompass all of equivalent structures and assemblies.

What is claimed is:

1. A device for inserting between layers of wooden boards or like rigid structures, comprising:
    a longitudinally elongated strip of stiff cellulosic material having a bottom layer of predetermined constant width and formed with a pair of top layers over the majority of the width thereof, and defining a plane;
    means for maintaining the layers together;
    means for imparting bending resistance to said strip so that when held at one end with that end horizontal the free end does not deflect significantly from the horizontal, said means consisting of a pair of longitudinally extending single layer deformable projections formed from said stiff cellulosic material, one provided at each of the lateral edges of said strip, and each standing upright from said plane substantially the entire length of said strip; each said projection being defined by a longitudinally extending channel that is substantially triangular in cross-section with two legs of the triangle formed from one of said top layers joining at an obtuse angle and defining an apex upstanding from said one layer, and the third leg of the triangle formed from the bottom layer with said third leg coplanar with said bottom layer; and
    means for preventing buckling of said channels, comprising a fibrous material bundle disposed in each of said channels.

2. A device as recited in claim 1 wherein said longitudinally upstanding projections are defined by several adjacent folding lines, each folding line extending longitudinally substantially the length of said strip.

3. A device as recited in claim 1 wherein said fibrous material bundles extend substantially the length of the channels with which they are associated, and are adhesively secured to the channels.

4. A device as recited in claim 1 wherein said strip is elongated in a first direction, and in combination with a stack of objects including a plurality of wooden boards or the like elongated in a second direction with said device inserted between two of said boards with said first direction transverse to said second direction.

5. A device as recited in claims 1 or 3 wherein each said fibrous material bundle comprises a plurality of strands of material selected from the group consisting essentially of hemp, sisal, or spun paper.

6. A device as recited in claim 1 wherein said means for maintaining said layers together comprises adhesive disposed in middle portions of said strip between said layers and laterally spaced from said longitudinally elongated projections.

* * * * *

UNITED STATES PATENT AND TRADEMARK OFFICE
CERTIFICATE OF CORRECTION

PATENT NO. : 4,293,605
DATED : October 6, 1981
INVENTOR(S) : Persson et al.

It is certified that error appears in the above—identified patent and that said Letters Patent is hereby corrected as shown below:

On the Title Page insert the following:

-- [73] Assignee: Sunne Industri AB, Sunne, Sweden--

Signed and Sealed this

Nineteenth Day of January 1982

[SEAL]

Attest:

Attesting Officer

GERALD J. MOSSINGHOFF

Commissioner of Patents and Trademarks